Figure 1:
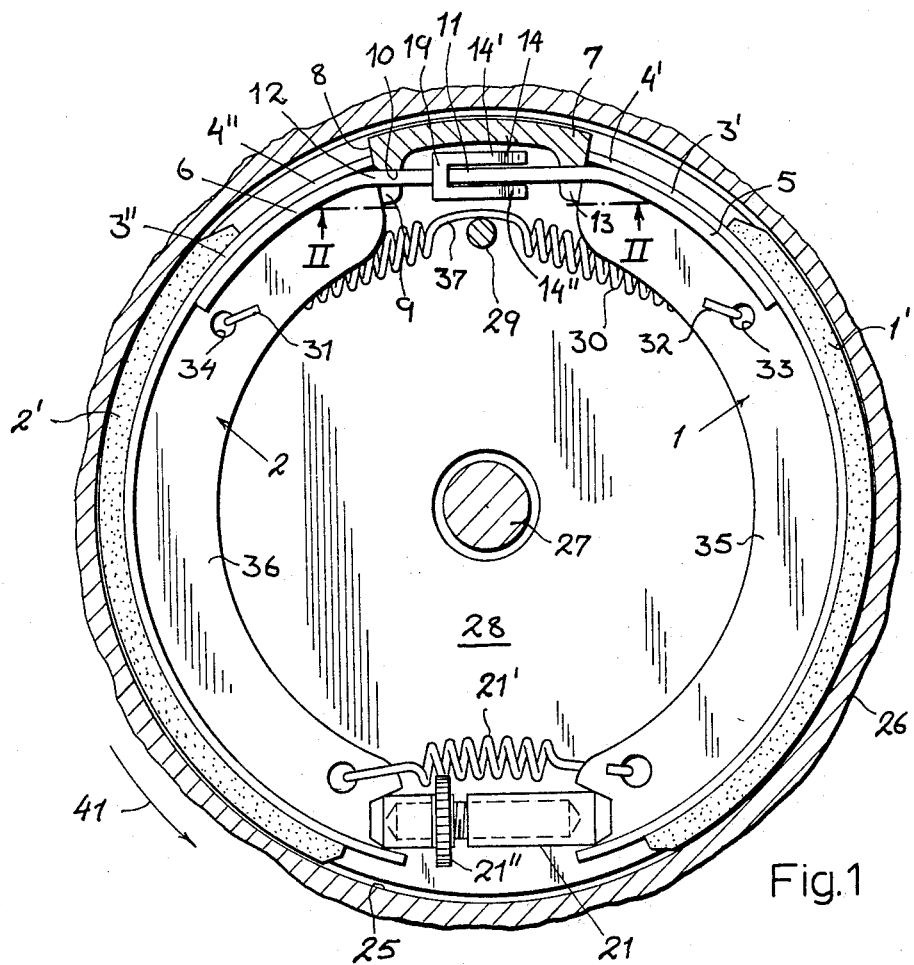

Sept. 20, 1966            C. PRESS            3,273,677
INTERNAL-EXPANSION BRAKE SYSTEM WITH REINFORCED
BRAKE-SHOE EXTENSIONS
Filed Sept. 2, 1964

Carl Press
INVENTOR.

BY Mestern, Ross & Mestern

United States Patent Office 3,273,677
Patented Sept. 20, 1966

3,273,677
INTERNAL-EXPANSION BRAKE SYSTEM WITH
REINFORCED BRAKE-SHOE EXTENSIONS
Carl Press, Offenbach, Germany, assignor to Alfred Teves
Maschinen- und Armaturenfabrik KG, Frankfurt am
Main, Germany, a German company
Filed Sept. 2, 1964, Ser. No. 393,976
Claims priority, application Germany, Sept. 3, 1963,
T 24,627
1 Claim. (Cl. 188—78)

My present invention relates to drum-type brake systems and, more particularly, to internal-expanding brakes wherein a pair of brake shoes are forced outwardly against an internal braking surface of a cylindrical brake drum to terminate or slow the rotation of the latter. Such brakes find their principal field of application in automotive vehicles wherein the brake drum is mounted upon the vehicle while the brake shoes are movably carried by a support means connected with the chassis.

In previous drum-type brake systems, it has been common practice to provide two generally segmental brake shoes, each having one extremity pivotally connected to the support (e.g. a so-called brake shield or backing plate) by respective anchor pins, and to use a cam or the like to force the brake shoes away from one another into generally radial engagement with the internal surface of the brake drum. This system required a relatively complex mounting arrangement for the brake shoes and was characterized by the application of considerable stresses to the actuating means (e.g. the cam and levers coupled therewith) as a consequence of the entrainment of the forwardly one of the brake shoes by the brake drum upon frictional engagement of the shoes with the drum.

It is the principal object of the present invention to provide an internal-expanding brake system of the drum-type which has a relatively simple arrangement for mounting and guiding the brake shoes and which is free from the stresses mentioned above.

A more specific object of this invention is to provide an improved but simplified drum-type brake system wherein entrainment of the brake shoes by the rotating drum will not disturb to any significant extent the support and actuating means for the shoes.

Yet another object of this invention is to provide an improved brake system of the character described having superior means for guiding the brake shoes within the drum.

These and other objects which will become apparent hereinafter are attained, in accordance with the present invention, by the provision of a drum-type brake system having a rotatable brake drum connectable, for example, to a wheel of an automotive vehicle and provided with a generally cylindrical internal brake surface, support means (e.g. a brake shield or backing plate connectable to the vehicle chassis in the conventional manner) surrounded by this surface, and a pair of brake shoes movably disposed on the support means and of generally segmental shape whereby the braking surfaces of these shoes are juxtaposed with diametrically opposite portions of the drum surface; the invention resides, according to one of its features, in the provision of abutment means on this support means and interposed between a pair of corresponding extremities, while having a pair of abutment faces respectively engageable thereby for selective immobilization of these extremities when they are brought into contact with the abutment means upon entrainment of the brake shoes by the drum. The actuating means of the brake system of the present invention can then include a lever interposed between these extremities of the brake shoes. Coupling means is provided at the two other extremities of the shoes for connecting them in force-transmitting relationship whereby actuation of one brake shoe to bring it into contact with the brake drum will result in more or less circumferential displacement of the other brake shoe as it too is brought into engagement with the drum, when the latter rotates in a direction from the first to the second brake shoe, thereby carrying an extremity of the second brake shoe into engagement with the respective abutment surfaces. To guide the brake shoes at the abutment surface, the abutment means is provided with a guide surface extending generally transversely to the pair of abutment faces and slidably engaged by the respective extensions at the extremities of the brake shoes proximal to the abutment means. These extensions, which are rigid and preferably integral with the backing plates of the brake shoes, are bent inwardly out of the arc of the brake shoes to slidably engage the guide surface of the abutment means. The abutment means may, moreover, be provided advantageously with guide surfaces bracketing these extensions laterally for preventing them from shifting parallel to the axis of rotation of the drum.

According to a specific feature of this invention, the extensions have interfitting formations at their proximal ends, e.g. a male projection received within a cutout or recess. The extensions lie in a plane generally perpendicular to the abutment faces and are preferably actuated by a U-shaped, box-like actuating lever having a planar portion interposed between these ends of the extensions and permitting the male formation to pass therethrough with clearance. The flanks of the U-shaped member thus can lie in planes parallel to the plane of the extensions while the planar portion referred to extends perpendicularly to this latter plane. The brake shield of the support means can then be provided with an aperture through which the actuating lever projects for displacement of the latter by any conventional brake means, e.g. a flexible shaft, hydraulic cylinder, toggle linkage or the like. The coupling means according to the present invention may be of the self-adjusting type whose length is automatically increased upon actuation of the brake to compensate for wear of the brake linings. The brake shoes can be resiliently suspended on the support means by the restoring springs which tend to draw the brake shoes toward one another out of engagement with the drum. The coil springs provided for this purpose can be floatingly carried on, for example, a pin rigid with the brake shield or support means.

Figure 2:
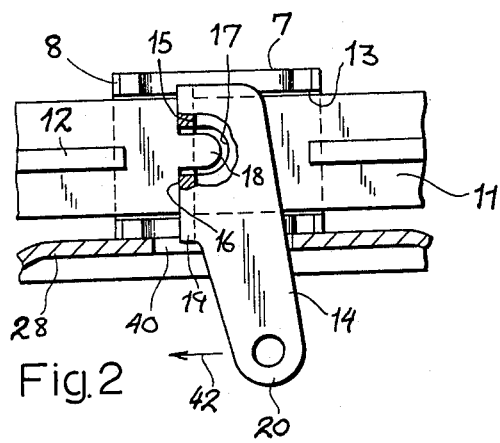

The above and other objects, features and advantages of the present invention will become more readily apparent from the following description of an embodiment thereof, reference being made to the accompanying drawing in which:

FIG. 1 is a vertical cross-sectional view through a brake drum of a motor vehicle, the brake embodying the present invention; and FIG. 2 is a cross-sectional view taken along the line II—II of FIG. 1.

In the drawing, I show a pair of brake shoes 1, 2 whose brake linings 1′, 2′ may be of the sintered-metal type and are carried by arcuate backing plates 3′, 3″, respectively. The brake shoes are of generally segmental configuration and are juxtaposed with an inner braking surface 25 of a rotatable brake drum 26 carried by the wheel axle 27 of the vehicle. The axle 27 passes with clearance through the brake shield or backing plate 28 upon which the abutment means or block 7 is provided. The shield 28 is carried by the vehicle chassis in the usual manner. A pin 29, rigid with the backing plate 28, floatingly suspends the brake shoes 1, 2 via a restoring spring 30 whose extremities 31, 32 are received in apertures 33, 34 in the reinforcing ribs 35, 36 of the backing plates 3′, 3″, respectively. The central portion 37 of this resilient means is free from coil-spring turns and rests upon the pin 29. The ends 4', 4" of the backing plates 3 proximal to the abutment block 7 are provided with extensions 5, 6 which can be welded to the backing plates but, preferably, are integral therewith, these extensions being bent at their ends 11, 12 inwardly out of the arcuate shape of the backing plates and lie in a common plane while projecting toward one another.

The abutment means 7 has a pair of radial abutment faces 8, respectively engageable by the ends 4', 4" of the brake shoes to immobilize these ends, as will become apparent hereinafter. In addition, the abutment block 7 is provided with a pair of recesses 9 having a guide surface 10 lying generally in a plane parallel to the axis of rotation of the drum and forming the floor of the recesses. Since abutment surface 10 is parallel to the plane of the extensions 5, 6, the latter are slidably guided thereon and permit expansion of the brake shoes against the inner surface 25 of the drum 26. The lateral surface 13 of the recesses 9 restrain the extensions 5, 6 from axial movement and slidably engage the lateral edges of these extensions. Between the extensions 5 and 6, I provide a U-shaped block-like actuating lever 14 having a planar portion 19 extending perpendicularly to the plane of the extensions 5, 6 and engageable thereby at surfaces 15, 16.

The ends 11 and 12 of the extensions 5 and 6 bear against the surfaces 15 and 16 as indicated and are provided with interfitting formations including a recess or cutout 17 formed in the extension 11 and a male formation or tongue 18 provided on the extension 12. The interfitting formations 17 and 18 ensure alignment and substantial coplanarity of the ends 11 and 12. The planar portion 19 of actuating lever 14 is provided with an opening through which the tongue 18 passes with clearance. The flanks 14', 14" of the actuating lever 14 extend parallel to the plate-like extensions 11 and 12, while the lever is provided with a control end 20 passing through an opening 40 in the brake shield 28 for operation by any conventional brake-control device. The extensions 5, 6 are composed of metallic plate material as is evident from FIGS. 1 and 2.

In the dual servobrake described, the brake force is transferred, upon actuation and entrainment of one brake shoe, to the other brake shoe via a coupling means 21 of the extensible-stud type. A spring 21' draws the ends of the brake shoes at this coupling means toward one another while a ratchet wheel 21" is provided for automatic adjustment of the brake to compensate for wear of the brake shoes. The automatic adjustment is advantageously of the type disclosed in the commonly assigned copending application Ser. No. 329,837, filed December 11 1963.

When the brake drum rotates in the direction of arrow 41 (FIG. 1) actuation of the brake lever 14 (arrow 42) will bring the brake shoe 2 into engagement with the brake drum whereupon this brake shoe will be entrained in the counterclockwise sense and transfers a similar movement to brake shoe 1 with the abutment 7 at its extremity 4' and is thus held against the brake drum. A corner of the edge of the extremity 11 of the secondary brake shoe 1 is thus presented to the inner surface of the planar portion 19 of the actuating lever and forms a relatively fixed abutment about which the actuating lever pivots. The opposite edge of end 12 of surface 16 can thus be urged to the left (FIG. 2) by further displacement of the actuating lever in the direction of arrow 42. When the drum is rotating in the opposite sense, brake shoe 1 becomes the primary braking member while brake shoe 2 bears against the abutment 7 and is the secondary braking member. During the braking of the drum, the extensions 11, 12 become somewhat inclined to one another so that the gap between the flanks 14', 14" must be made sufficiently wide to accommodate this slight inclination.

While the present invention has been described with reference to a particular brake construction, it is to be understood that the features of the invention are equally applicable to variations of this system within the scope of the appended claim.

I claim:
A drum-type brake system, comprising:
a brake drum rotatable about an axis and having a generally cylindrical internal brake surface centered thereon;
support means surrounded by said surface;
a pair of generally segmental brake shoes juxtaposed with diametrically opposite portions of said surface and movably disposed on said support means, said brake shoes being generally elongated and having two pairs of corresponding extremities, said brake shoes each including
a respective arcuate backing member generally parallel to the respective portion of said surface,
a respective brake lining affixed to each of said backing members and disposed between said surface and the respective backing member, and
a pair of ribs extending inwardly along said backing members and transversely thereto;
coupling means interconnecting one of said pairs of extremities of said brake shoes in force-transmitting relationship;
abutment means on said support means interposed between the other pair of extremities and having a pair of abutment faces respectively engageable thereby and fixed with respect to said support for selective immobilization of said other extremities of said brake shoe, said abutment means having a guide surface generally transverse to said faces, said brake shoes being formed with respective, generally coplanar extension plates at said other extremities substantially perpendicular to said faces and projecting therebeyond toward one another, said extension plates being parallel to said guide surface and slidably engageable thereby while being secured to the respective backing members, said extensions having interfitting formations at their proximal ends,
actuating means at said abutment means and interposed between said other extremities for shifting said brake shoes into engagement with said brake surface, said actuating means including an actuating lever of U-shape configuration extending through said support means having a generally planar portion transverse to said extension plate and disposed therebetween for shifting said brake shoes, one of said formations being constituted as tongue passing with clearance through said planar portion of said lever, the other of said formations having a cutout receiving said tongue, said abutment means being recessed to provide a pair of lateral guide surfaces bracketing said extension plates and preventing them from shifting parallel to the axis of rotation of said drum, said actuating lever being formed with a pair of flanks extending perpendicularly to said planar portion and parallel to said extension plates on opposite sides thereof in the region of interengagement of said formations; and
resilient means drawing said brake shoes toward one another and floatingly mounting said brake shoes on said support means.

References Cited by the Examiner
UNITED STATES PATENTS 2,140,741  12/1938  Goepfrich _____ 188—152
2,875,862  3/1959   Goepfrich _____ 188—106

FOREIGN PATENTS 1,318,157  1/1963  France.

DUANE A. REGER, *Primary Examiner.*